United States Patent Office 2,760,772
Patented Aug. 28, 1956

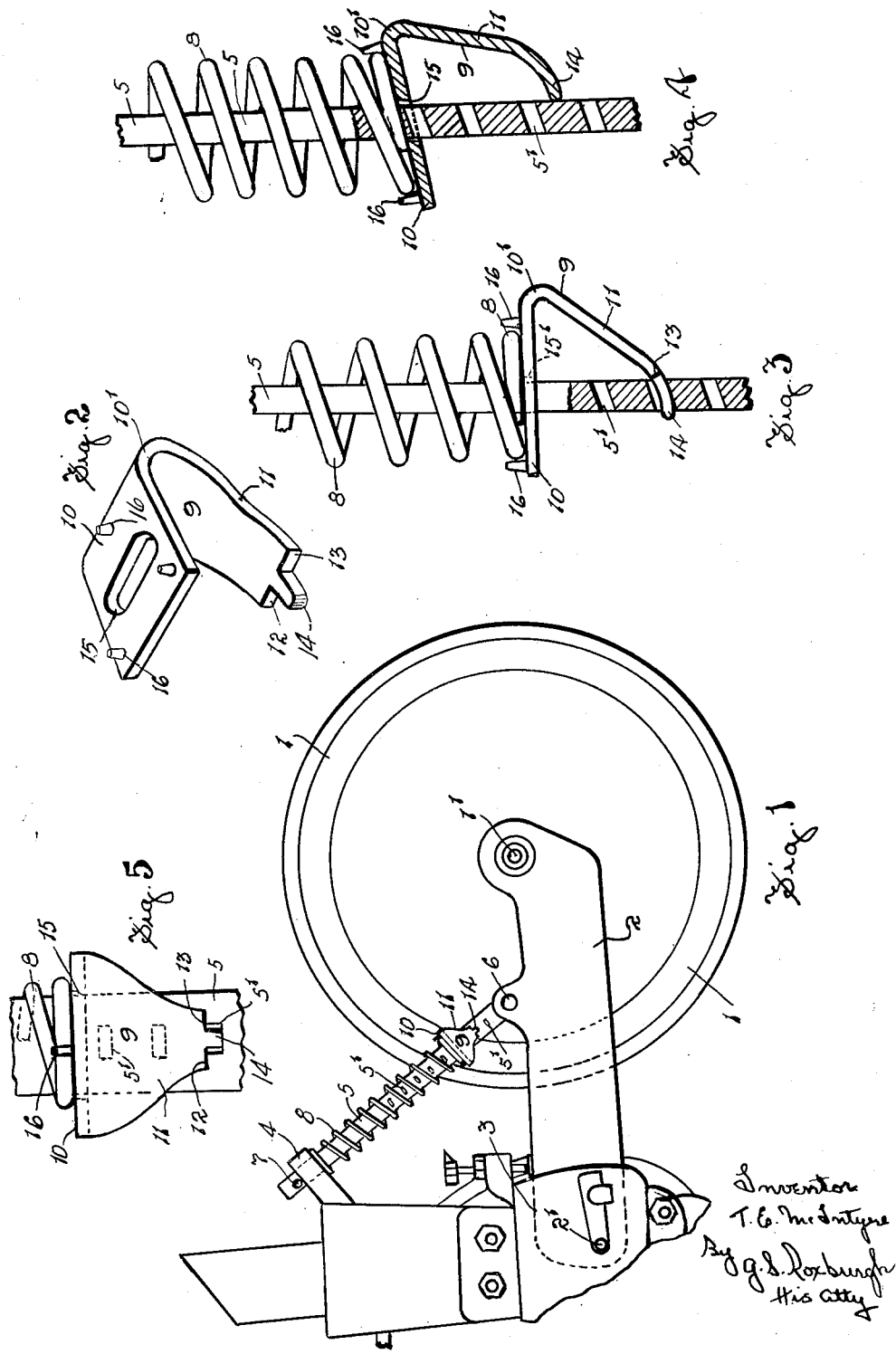

2,760,772

SPRING ADJUSTING ASSEMBLIES

Thomas E. McIntyre, Clearwater, Manitoba, Canada

Application February 1, 1954, Serial No. 407,516

5 Claims. (Cl. 267—20)

The invention relates particularly to an arrangement for adjusting the compression of a coiled spring mounted on a pressure bar and which is of simple, cheap, and durable construction and which permits of an adjustment being easily and quickly made and with little manual effort.

A more detailed object is to provide a catch slidably and cantably mounted on the bar and engageable with the free end of the spring and having an extending arm terminating in a central finger with adjacent stop shoulders and to supply the bar with a plurality of spaced slots to receive the finger in the manipulation of the catch on the bar and by so doing releasably lock the catch to the bar in various compressed conditions of the spring.

A further object is to so design the catch that it can be readily spanned by the fingers for ease in manipulation and also to so shape the finger of the catch and the slots in the bar that entry and withdrawal of the catch finger is facilitated and assured.

A further object is to so construct the device that one by varying the points of application of finger pressure on the catch can cause the catch finger to withdraw from the bar slot or to reenter the slot, the catch being also under the influence of the spring when the compression of the latter is being adjusted.

With the above more important objects in view the invention consists essentially in the arrangement and construction of parts shortly to be described in detail, reference being had to the accompanying drawing in which:

Fig. 1 shows a part of a seeding machine supplied with a trailing wheel, a pressure bar and a coiled spring and showing my invention supplied for spring compression adjustment.

Fig. 2 is a perspective view of the catch.

Fig. 3 is an enlarged, detailed side view of the spring, bar and catch, the lower end of the bar being shown in central, vertical section and the finger of the catch being shown in one of the bar slots.

Fig. 4 is a view similar to Fig. 3, the catch being shown in vertical section and in a position where the finger thereof is riding the face of the bar.

Fig. 5 is a front view of the catch and a portion of the bar and spring.

In the drawing like characters of reference indicate corresponding parts in the several figures.

The invention is particularly beneficial for use in adjusting pressure applying springs on agricultural implements, although its use is not to be considered as confined to such implements as it can be used to advantage in any location where a coiled spring is to be compressed varying amounts on a bar passing centrally through the same.

In the attached drawing, the device is shown in Fig. 1 as used on a seeding machine and where there is, say a trailing wheel 1, such as a packer wheel, rotatably carried at 1' by the rear end of an arm 2 which has its forward end pivoted on a bolt or pin 2' carried by the body portion of the seeder which is indicated generally by the reference number 3. The body of the seeder presents a top lug 4 through which a flat bar 5 slidably passes, the lower end of the bar being pivotally connected to the arm by a pivot pin 6 and the top end thereof, above the lug, being supplied with a stop pin 7. A compression spring 8 surrounds the bar and has its upper end against the lug and its lower end engaged by my catch.

The invention is shown in detail in the other figures of the drawing and in carrying out the invention the bar 5 is supplied with a series of spaced, similar, inclined, central slots 5', the number of slots depending on the range of spring adjustment required.

The bracket like catch which I supply with such a bar is indicated generally by the reference number 9. It comprises a rigid strip of metal bent crosswise as indicated at 10' to supply a flat, spring engaging plate 10 and a downwardly and inwardly inclining arm 11 the lower end of which terminates in opposing shoulders 12 and 13 located at the sides of a centrally disposed extending finger 14. The finger is slightly less in width than the width of the slots in the bar and its thickness is slightly less than the depth of the slots, the arrangement being such that the finger can freely enter any slot when so desired.

The arm gradually narrows in width in passing from the plate to the shoulders, its particular shape being to permit one to readily span the arm with his fingers and with the object of bringing the tips of the fingers into engagement with the underside of the plate 10, to manipulate the same against spring pressure.

Assuming that the catch is on the bar end engaging the lower end of the spring and that the finger 14 is in one of the slots 5', such as shown in Fig. 3, it will be obvious that if one presses upwardly on the underside of the plate with his fingers and cants it, the finger 14 will be withdrawn from the slot and that if upward finger pressure by hand is continued, the catch can be moved upwardly on the bar against spring pressure until it is desired to reset the catch. If at such time the finger pressure is transferred to the forward edge of the plate, that is towards the end remote from the bend, the trailing finger of the catch under spring pressure will click into a slot and upon hand pressure being removed the catch will hold the spring securely in its adjusted position. Obviously the stop shoulders, by engagement with the rear face of the bar, limit the distance which the catch finger enters the slot. To reduce spring pressure one only requires to manipulate his fingers in a manner to cause the withdrawal of the catch finger from the slot in the bar and then while holding it out allow the catch to move downwardly on the bar under spring pressure until the desired lower slot is reached at which time the operator's finger pressure is transferred forwardly on the underside of the plate and the spring then forces the catch finger into the reached slot.

It will be noted that the width of the slot 15 in the plate controls the amount of canting permitted the catch and so controls the outswing of the catch finger.

In actual operation during adjustment, the lower coil of the spring remains in full contact with the upper face of the plate, the body of the spring distorting, as is usual, throughout its length. It is desirable to provide means to prevent the lower-most coil of the spring from shifting from a central position on the plate and such can be accomplished by providing the plate with a number of centering stops to take a position, at intervals, around such lower end. Such stops are herein shown as a number of upstanding tits 16 but obviously they could be in a number of other forms such as by turning the forward corners of the plate upwardly and supplying the rear part of the plate, adjacent the bend with an upstanding lug struck from the material of the plate.

It will also be seen that instead of canting the catch on the plate one could manipulate the catch on the bar by first horizontally outshifting and then uplifting it, provided the slot 15 were wide enough to permit the catch to withdraw from the slot in the outward movement.

I might mention also that the bar could vary in cross section. Surmising that it were tubular, it could be supplied with a series of say, round holes instead of slots, to receive the catch finger in its various adjusted positions. Such a modified arrangement would not however effect the described operation of the catch as will readily be apparent.

What I claim as my invention is:

1. In combination with a pressure bar and a coiled spring mounted thereon and having one end anchored and the other end free, a spring adjusting catch having a plate engaging the free end of the spring and having a slot receiving the bar for sliding and canting movement and provided with an arm extending in a direction away from the spring and deflected inwardly towards the bar and terminating in a central, projecting finger having stop shoulders at the sides thereof, the said bar being supplied with a series of spaced, central slots to receive the finger with the shoulders engaging the face of the bar.

2. The device as set forth in claim 1 wherein the arm gradually narrows in width in passing from the plate to the shoulders to permit of the ready manipulation of the catch with an operator's fingers spanning the arm and having their tips engaging the underside of the plate.

3. The device as claimed in claim 1 wherein the slots in the bar are inclined with their higher sides towards the arm and the finger of the arm is shaped for ready passage into any slot in the canted position of the plate.

4. The device as claimed in claim 1 wherein the width of the slot in the plate limits the out position of the finger of the arm.

5. The device as claimed in claim 1 wherein the plate is provided with means to prevent side shifting of the lower end of the spring on the plate.

References Cited in the file of this patent

UNITED STATES PATENTS

| | | |
|---|---|---|
| 693,307 | Pelton | Feb. 11, 1902 |
| 706,287 | Yahn | Aug. 5, 1902 |
| 1,340,581 | Van Brunt | May 18, 1920 |
| 1,506,820 | Erdman et al. | Sept. 2, 1924 |
| 1,843,262 | Bales et al. | Feb. 2, 1932 |